J. S. DAVIS.
Portable Harrow.
No. 20,410.
Patented June 1, 1858.
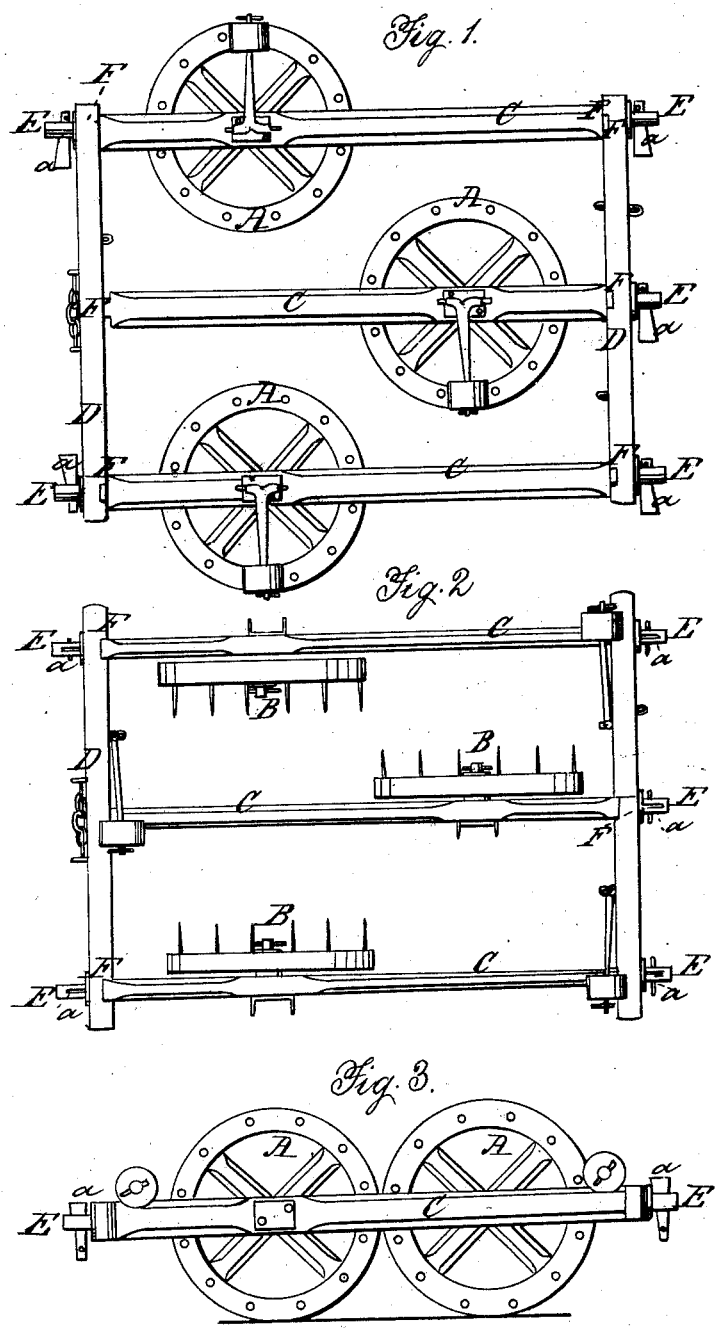

UNITED STATES PATENT OFFICE.

JNO. S. DAVIS, OF WASHINGTON, OHIO.

IMPROVEMENT IN HARROWS.

Specification forming part of Letters Patent No. 20,410, dated June 1, 1858.

*To all whom it may concern:*

Be it known that I, JOHN S. DAVIS, of Washington, in the county of Hancock and State of Ohio, have invented new and useful Improvements in Portable Harrows; and I do hereby declare the following to be a full and exact description thereof, reference being had to the accompanying drawings, in which—

Figure 1 is a top view of the harrow; Fig. 2, a top view with the rotating or circular harrows turned upon their edges, and Fig. 3 a side view.

Like letters refer to like parts in the different views.

The nature of my invention consists in such a construction of a harrow that it may be conveniently made portable and transported from place to place without difficulty. In order to accomplish this I construct three or more wheels, say, three or three and a half feet in diameter. These may be made of the form seen at A A A, Fig. 1; or they may be constructed in any other desirable form, with teeth inserted around the rim. These wheels I place upon wrists B, that are attached to the frame-pieces C C C, one wheel to each piece, as seen in Figs. 1 and 2. These pieces C C C have a round tenon upon each end, which fits a round hole in the end pieces, D D, where they are secured by a washer and key, *a*, as seen at E E E, Figs. 1, 2, and 3, the keys being prevented from coming out of the mortise by a small pin passing through the end.

Upon the inner face of the end pieces there is cut a gain, F, Figs. 1 and 2, into which the shoulders of the pieces C enter, and where they are secured by the keys *a* when the harrow-wheels A are turned upon their edges, in which condition they are seen in Fig. 2. The pieces C, to which the revolving harrows are attached by the wrists B, are placed in the position seen in Fig. 1 when the harrow is to be used. This brings the harrows into a horizontal plane, and the key *a* being shoved back to its point, it there holds the tenons of the pieces C from pulling out of the holes in the end pieces, D. The round tenons upon these pieces, to which the harrows are attached by the wrists B, allow the barrow to accommodate itself to any inequalities of the ground.

In rendering the harrow portable the pieces C are rotated a quarter around, the outside pieces having their top surfaces turned outward and the shoulders drawn into the gains F, and there held by the keys *a*. The circular harrows will then occupy the position seen in Figs. 2 and 3, and in this manner the harrow is rendered portable, the harrows forming the wheels upon which it moves, the teeth by this arrangement being upon the inside and not liable to strike against obstructions in passing along. This mode of attaching the circular harrow to a rotating piece constituting a part of the frame I consider as superior to hinging the circular harrow to an axle-tree, because it makes the whole frame-work more substantial and less liable to get out of order, because the side pieces, C, fit closely into the gains F, and are there firmly held by the keys *a*, but can be changed in their position in a few moments by loosening the keys and slipping the pieces D D outward.

What I claim as my invention, and desire to secure by Letters Patent, is—

The arrangement of the harrows A with the frame C D, the whole being constructed for operation conjointly in the manner and for the purpose herein set forth.

JOHN S. DAVIS.

Witnesses:
   J. BRAINERD,
   W. H. BURRIDGE.